US010039097B2

(12) United States Patent
Polehn et al.

(10) Patent No.: US 10,039,097 B2
(45) Date of Patent: Jul. 31, 2018

(54) REMOTE HEAD SIMULTANEOUSLY TRANSMITTING RADIO WAVE

(71) Applicant: VERIZON PATENT AND LICENSING INC., Arlington, VA (US)

(72) Inventors: Donna L. Polehn, Kirkland, WA (US); Mark T. Watts, Providence, RI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 541 days.

(21) Appl. No.: 14/703,345

(22) Filed: May 4, 2015

(65) Prior Publication Data

US 2016/0330736 A1    Nov. 10, 2016

(51) Int. Cl.
| | |
|---|---|
| H04W 72/04 | (2009.01) |
| H04B 15/00 | (2006.01) |
| H04L 25/00 | (2006.01) |
| H04W 56/00 | (2009.01) |
| H04W 72/12 | (2009.01) |
| H04W 88/08 | (2009.01) |

(52) U.S. Cl.
CPC ........ H04W 72/0446 (2013.01); H04B 15/00 (2013.01); H04L 25/00 (2013.01); H04W 56/00 (2013.01); H04W 72/12 (2013.01); H04W 88/085 (2013.01)

(58) Field of Classification Search
CPC ........... H04B 15/00; H04L 25/00; H04L 5/00; H04W 56/00; H04W 72/0446; H04W 72/12; H04W 88/085

USPC .......................................................... 370/329
See application file for complete search history.

(56) References Cited

U.S. PATENT DOCUMENTS

| | | | | |
|---|---|---|---|---|
| 8,832,390 | B1* | 9/2014 | Ahmad | G06F 9/4856 711/154 |
| 2008/0285444 | A1* | 11/2008 | Diab | H04L 12/2805 370/230.1 |
| 2012/0163299 | A1* | 6/2012 | Chen | H04W 56/004 370/328 |
| 2012/0189074 | A1* | 7/2012 | Jin | H04B 7/024 375/267 |
| 2013/0225144 | A1* | 8/2013 | Fleming | H04J 11/0053 455/418 |
| 2013/0322581 | A1* | 12/2013 | Piirainen | H04L 25/03343 375/343 |
| 2014/0119390 | A1* | 5/2014 | Rabinovich | H04L 43/0852 370/503 |
| 2016/0029205 | A1* | 1/2016 | Sirotkin | H04W 24/02 455/418 |

(Continued)

*Primary Examiner* — Omar Ghowrwal
*Assistant Examiner* — Kokou R Detse

(57) ABSTRACT

Systems and methods for communicating in an Ethernet cloud radio access network are disclosed. In some implementations, a baseband unit determines a time when a plurality of remote radio heads, accessible to a user equipment, are scheduled to transmit a signal to the user equipment. The baseband unit transmits, via an Ethernet connection and in advance of the determined time, the signal and information about the determined time to each of the plurality of remote radio heads, to enable the plurality of remote radio heads to simultaneously transmit, at the determined time and via a radio connection, a Fourier transform of the signal to the user equipment.

20 Claims, 7 Drawing Sheets

(56) References Cited

U.S. PATENT DOCUMENTS

2016/0088581 A1\* 3/2016 Lorenz .............. H04W 56/0065
455/456.1

\* cited by examiner

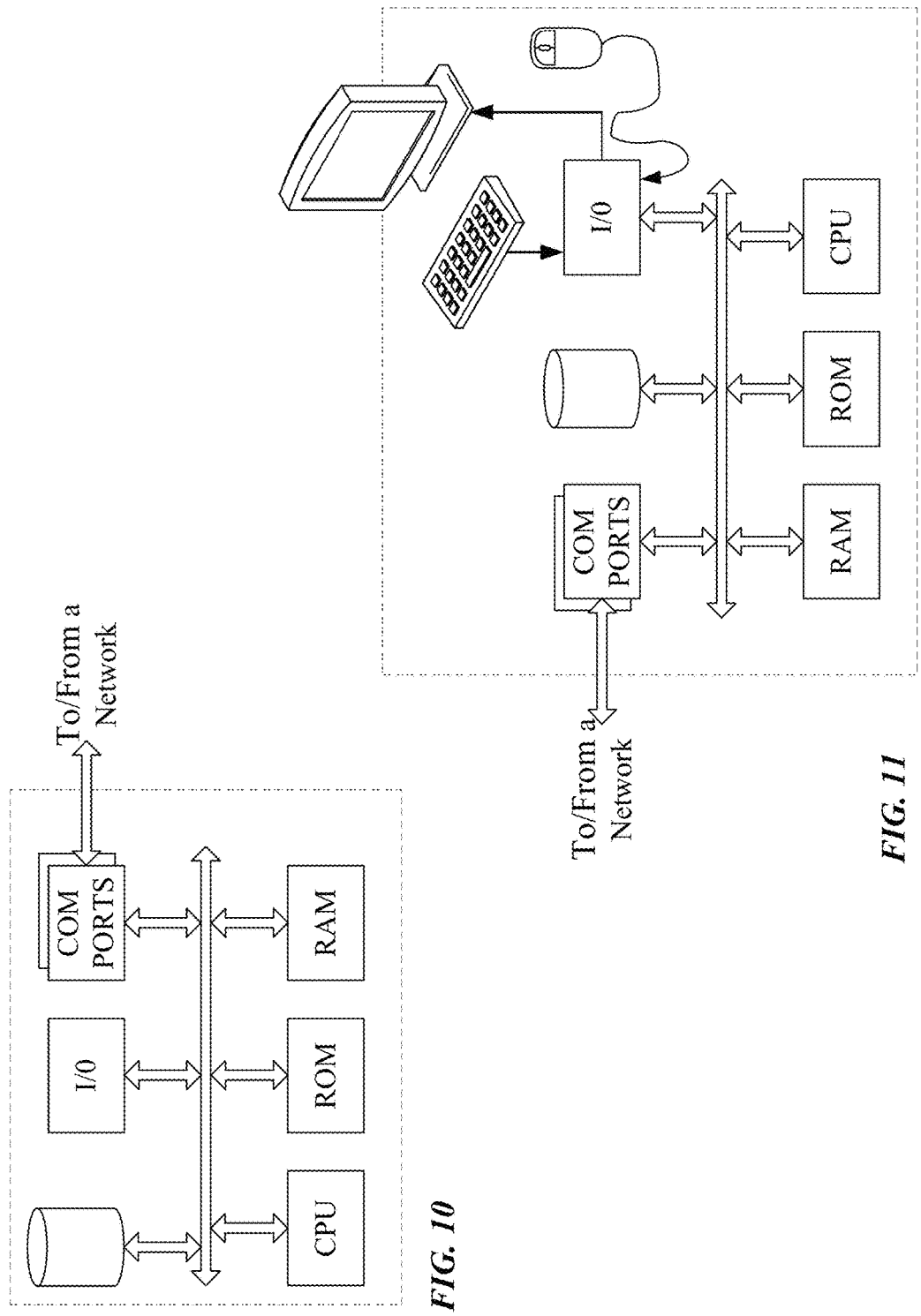

REMOTE HEAD SIMULTANEOUSLY TRANSMITTING RADIO WAVE

BACKGROUND

A user equipment (UE), such as a mobile phone, may receive voice or data signals through a cellular network, for example a long term evolution (LTE) network. The UE may be connected to the cellular network via one or more remote radio heads (RRHs) that are accessible to the UE. In some cases, multiple RRHs may be accessible to the UE. The UE may communicate with one of the RRHs to receive a signal representing information (e.g., a web page or a voice call) requested by the user of the UE. Simultaneously, the UE may receive noise from the other accessible RRHs, reducing the quality of the signal or increasing the processing requirements at the UE to cancel out the noise. As the foregoing illustrates, a new approach for reducing noise in environments with multiple RRHs may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 10 is a simplified functional block diagram of a computer that may be configured to host virtual machines functioning as a baseband unit; and FIG. 11 is a simplified functional block diagram of a personal computer or other work station or terminal device, which may be configured to host virtual machines functioning as a baseband unit.

DETAILED DESCRIPTION

Figure 1:
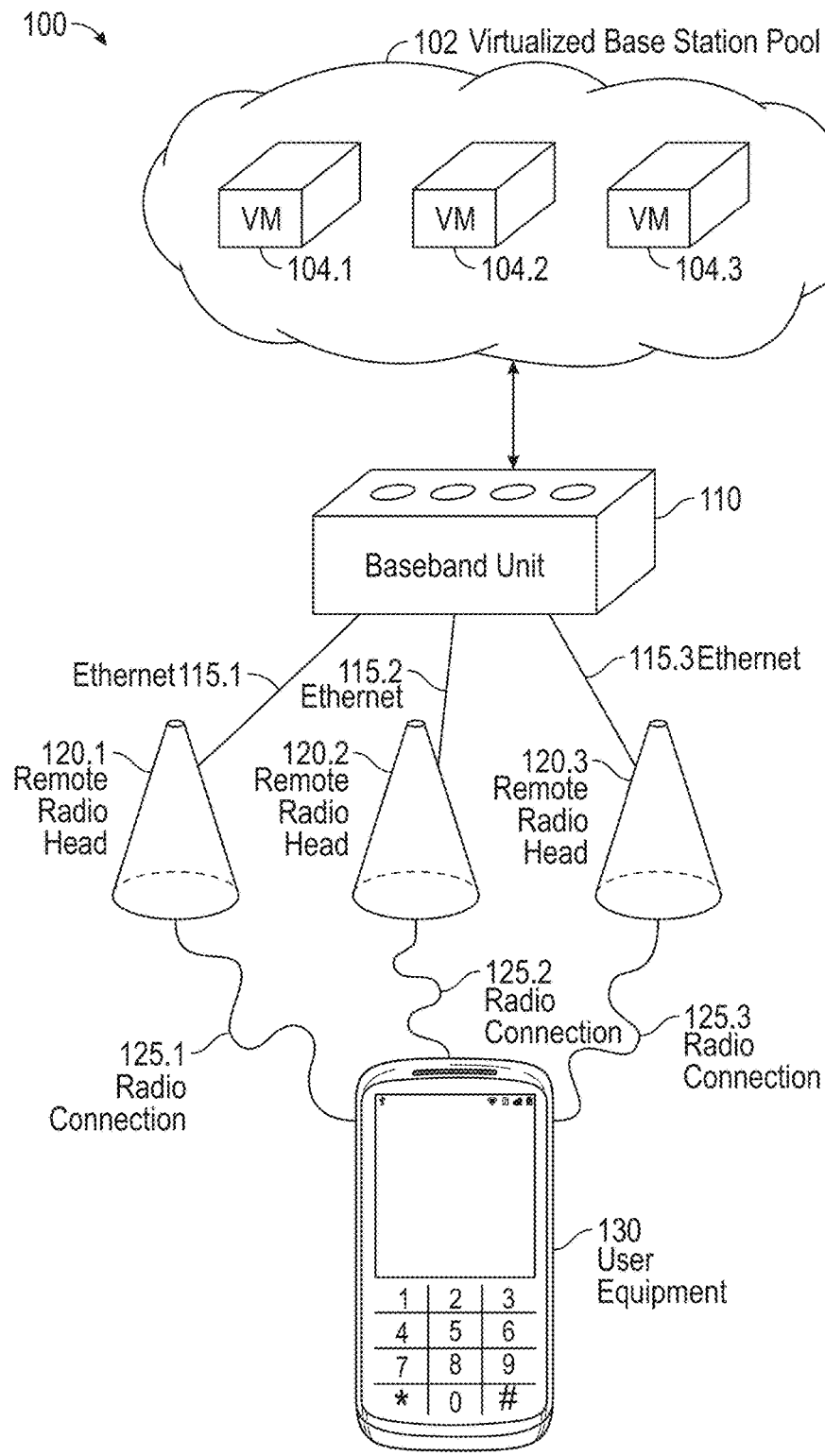
FIG. 1 illustrates an exemplary Ethernet cloud radio access network system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As set forth above, a new approach for reducing noise in environments with multiple RRHs may be desirable. In some long term evolution (LTE) network implementations, a baseband unit (BBU) is connected to each remote radio head (RRH) via a dark fiber cable. The dark fiber cable is an optical fiber cable through which voice or data signals may be transmitted at a high speed. The signal is transmitted from the BBU to each RRH accessible to a user equipment (UE), such as a mobile phone. The signal is then transmitted from each RRH to the UE. Each RRH receives the signal from the BBU and transmits the signal to the mobile phone at the same time. Thus, the mobile phone receives signals from all of the accessible RRHs, and might not receive noise from the RRHs. The scheme described above is useful for reducing noise in environments with multiple RRHs. However, one drawback of this scheme is that this scheme requires dark fiber cable connections between the BBU and each RRH, and such dark fiber connections may be expensive for cellular network operators. As the foregoing illustrates, approaches for reducing noise in environments with multiple RRHs that do not rely on dark fiber cable connections may be desirable. The speed at which signals are transmitted through the dark fiber cable is calculated according to the equation $v=c/n$, where v is the speed at which signals are transmitted, c is a constant equal to the speed of light, which is $3*10^8$ meters per second, and n is the index of refraction in the medium, such as optical cable. For example, in a fused silica fiber optic cable, the index of refraction, n, is 1.57, and the speed at which signals are transmitted is $3*10^8/1.57$ meters per second.

The subject technology, according to some implementations, provides approaches for reducing noise in environments with multiple RRHs that do not rely on dark fiber cable connections. Instead of using dark fiber connections, less expensive Ethernet connections may be used between the BBU and each RRH.

According to some examples, the BBU determines a time when multiple RRHs that are accessible to a UE are to transmit a signal to the UE. The BBU transmits, via an Ethernet connection, the signal and the determined time to each of the multiple RRHs accessible to the UE. Each RRH computes a Fourier transform of the signal. At the determined time, the multiple RRHs simultaneously transmit, via a radio connection, a Fourier transform of the signal to the UE.

The Ethernet connection between the BBU and the RRHs may be for transmitting a frame. The frame may include one or more bytes for storing the signal to be transmitted to the UE, one or more bytes for storing a destination address of the UE, and one or more bytes for storing the time to transmit the signal to the UE. Each RRH may determine when the time to transmit the signal to the UE has arrived using a precision clock coupled to a global positioning system (GPS) unit.

In the Ethernet frame, the determined time for a RRH to transmit the signal to the UE may be represented as a delay time after receipt of the signal at the RRH. Alternatively, the determined time may be represented as an amount of time before or after a preset starting time point. For example, the preset starting time point may be 12:00:00 AM New York City time on Jan. 1, 2015. In some examples, the determined time is represented as an integer value representing the milliseconds from a predefined epoch. In some operating systems, such as Linux, the epoch is Jan. 1, 1970 at 12:00:00 AM GMT. In some cases, the time reference determined above may not have high enough precision, and a differential from the above integer in microseconds or nanoseconds may be used.

The BBU may include a single physical server or multiple physical servers. Alternatively, the BBU may include a centralized virtual pool of base station resources for managing a cellular network. The time to transmit the signal to the UE may be determined using the centralized virtual pool of base station resources. The BBU may be implemented using a hypervisor that runs multiple virtual machines implementing various base station functions, including determining the time to transmit the signal to the UE.

FIG. 1 illustrates an exemplary Ethernet cloud radio access network system 100. As shown, the system 100 includes a baseband unit 110, remote radio heads 120.1-3, and a user equipment 130. The baseband unit 110 is connected to each remote radio head 120.k (where k is a number between 1 and 3) via an Ethernet connection 115.k. Each remote radio head 120.k is connected to the user equipment 130 via a radio connection 125.k. The baseband unit 110 includes one or more physical or virtual machines for controlling operations of the Ethernet radio access network system 100. Each remote radio head 120.k is connected to the baseband unit 110 via Ethernet 115.k and includes a radio transmitter/receiver for connecting to user equipment, such as the user equipment 130. Each remote radio head 120.k may be a cellular tower, a satellite in a satellite-based communications system, etc. While three remote radio heads 120.1-3 are illustrated, the system 100 may include any number of remote radio heads, and different remote radio heads may connect to different user equipment. The user equipment 130 may be any end-user device that connects to the radio access network, for example, a mobile phone, a tablet computer, a personal digital assistant (PDA), a laptop computer coupled with a network access card, a desktop computer coupled with a network access card, etc.

As shown, the baseband unit 110 is coupled with a virtualized base station pool 102. The baseband unit 110 may include the virtualized base station pool 102 or may host the virtualized base station pool 102. The virtualized base station pool 102 may include one or multiple virtual machines 104.1-3. The virtual machines 104.1-3 may include base station resources for managing a radio access network or a cellular network. While three virtual machines are illustrated, the virtualized base station pool may include any number of virtual machines. Each virtual machine 104.k (where k is a number between 1 and 3) may implement all or a portion of the network management and control functions of the baseband unit 110, such as determining the time when the remote radio heads 120.1-3 are to transmit the signal to the user equipment 130 via the radio connections 125.1-3.

In other words, the baseband unit 110 may include a centralized virtual pool of base station resources for managing a radio access network or a cellular network. The time to transmit the signal to the user equipment may be determined using the centralized virtual pool of base station resources. The baseband unit 110 may be implemented using a hypervisor that runs a plurality of virtual machines 104.1-3 implementing various base station functions, including determining the time to transmit the signal to the user equipment.

Figure 2:
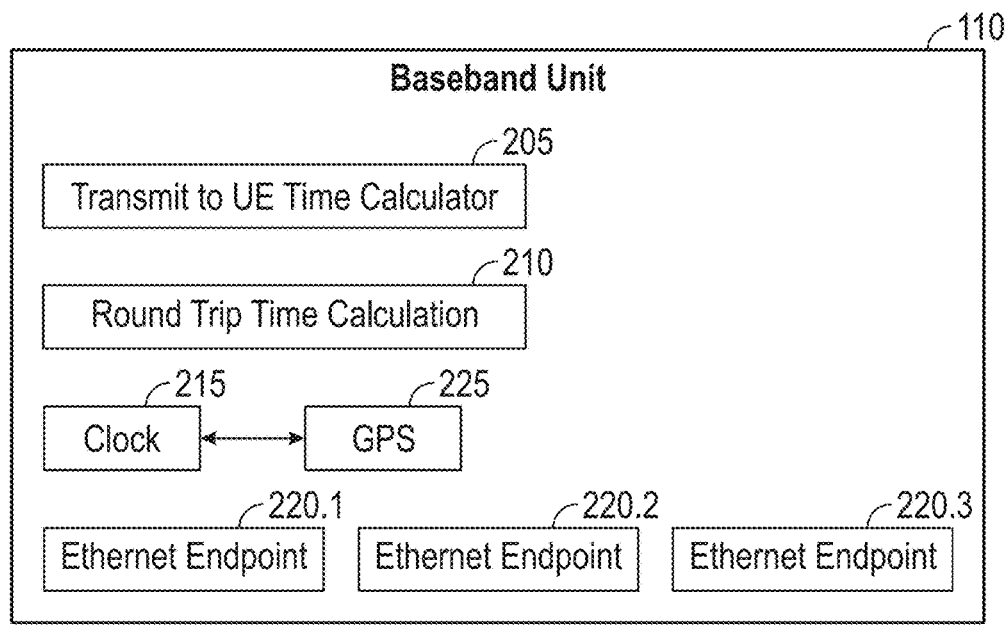
FIG. 2 illustrates an exemplary baseband unit of FIG. 1.

FIG. 2 illustrates an exemplary baseband unit 110 of FIG. 1. As shown, the baseband unit 110 includes a transmit to UE time calculator 205, a round trip time calculator 210, a clock 215, Ethernet endpoints 220.1-3, and a GPS unit 225. Each of the transmit to UE time calculator 205 and the round trip time calculator 210 may be implemented using one or more of the virtual machines 104.1-3.

The transmit to UE time calculator 205 may be implemented in software or in hardware. The transmit to UE time calculator determines a time when the remote radio heads 120.1-3 accessible to the UE should transmit the signal to the UE. The transmit to UE time calculator 205 may access the round trip time calculator 210 and/or the clock 215 in order to determine this time.

The round trip time calculator 210 determines a round trip time for an Ethernet communication between the baseband unit 110 and each of the remote radio heads 120.1-3. The round trip time calculator 210 is useful to the transmit to UE time calculator 205. This is because the time when the signal is transmitted to the UE 130 should occur after each of the remote radio heads 120.1-3 has received the signal from the baseband unit 110. Thus, all of the remote radio heads may transmit the signal simultaneously.

The clock 215 determines a current time. The clock 215 may be a precision clock that is coupled with a GPS unit 225. The clock 215 is useful to the transmit to UE time calculator 205 because knowledge of the current time may be useful in calculating a future time when to transmit the signal to the UE 130. For example, the future time when to transmit the signal to the UE 130 may correspond to the current time plus an offset.

The Ethernet endpoints 220.1-3 couple with the Ethernet connections 115.1-3, shown in FIG. 1, to allow the baseband unit 110 to communicate, over Ethernet, with the remote radio heads 120.1-3. As shown, there are three Ethernet endpoints 220.1-3. However, just as the subject technology may be any number of remote radio head, the subject technology may be implemented with any number of Ethernet endpoints. In some examples, there may be as many Ethernet endpoints as there are remote radio heads. Alternatively, two or more remote radio heads may share an Ethernet endpoint at the baseband unit 110.

Figure 3:
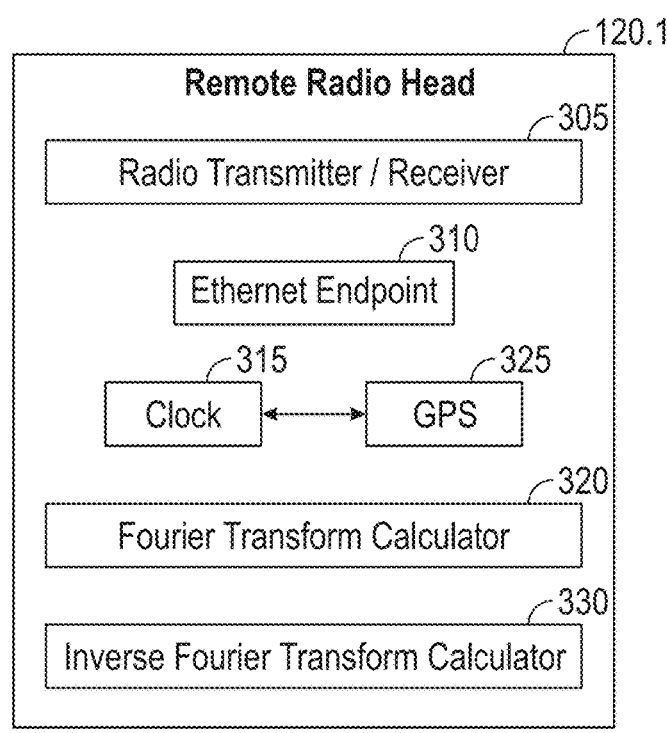
FIG. 3 illustrates an exemplary remote radio head of FIG. 1.

FIG. 3 illustrates an exemplary remote radio head 120.1 of FIG. 1. The other remote radio heads 120.2-3 may include components similar to the radio head 120.1. As shown, the remote radio head 120.1 includes a radio transmitter/receiver 305, an Ethernet endpoint 310, a clock 315, a Fourier transform calculator 320, an inverse Fourier transform calculator 330, and a GPS 325.

The radio transmitter/receiver 305 transmits and receives radio signals, for example, cellular radio signals. The radio transmitter/receiver 305 allows the remote radio head 120.1 to communicate with the user equipment 130 via the radio connection 125.1. The radio transmitter/receiver may also allow the remote radio head 120.1 to communicate with other user equipment. The Ethernet endpoint 310 allows the remote radio head 120.1 to communicate with the baseband unit 110 over the Ethernet connection 115.1.

The clock 315 determines a current time. The clock 315 may be a precision clock that is coupled with a GPS unit 325. The clock 315 is used to determine when the time, determined by the baseband unit 110, to transmit the Fourier transform of the signal to the user equipment has been reached.

The Fourier transform calculator 320 calculates a Fourier transform of a signal to transmit the signal as a radio wave to the user equipment 130, and the inverse Fourier transform calculator 330 calculates an inverse Fourier transform of a radio wave to generate a digital signal. As is well-known a digital signal may be transformed into an analog wave by applying a Fourier transform to the digital signal. The analog wave may be transformed back to the digital signal by applying an inverse Fourier transform. A Fourier transform for any real number ξ may be calculated according to Equation 1.

$$\hat{f}(\xi) = \int_{-\infty}^{\infty} f(x) e^{-2\pi i x \xi} dx,$$  Equation 1

The Fourier transform may be implemented as a fast Fourier transform or a discrete Fourier transform. An inverse Fourier transform for any real number x may be calculated according to Equation 2.

$$f(x) = \int_{-\infty}^{\infty} \hat{f}(\xi) e^{2\pi i \xi x} d\xi,$$  Equation 2

Figure 4:
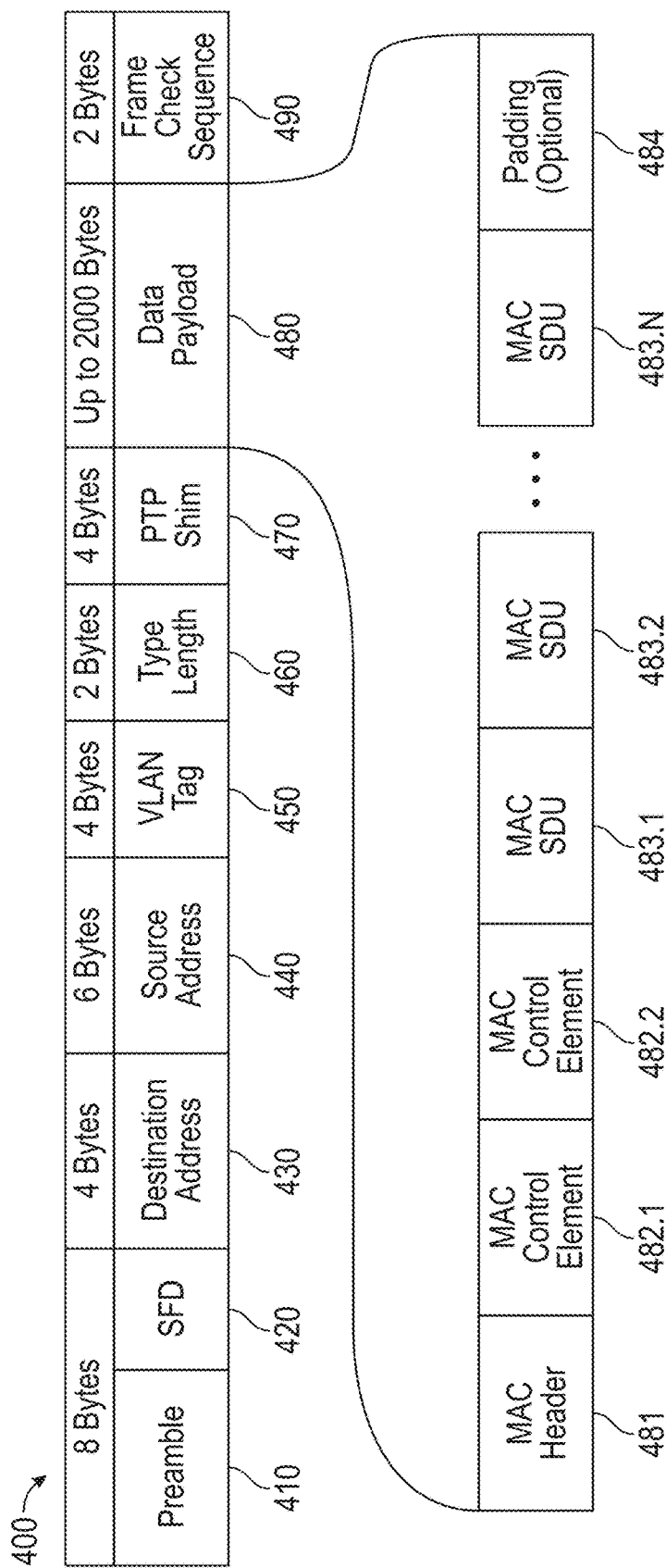
FIG. 4 illustrates an exemplary Ethernet frame which may be communicated using the Ethernet connection of FIG. 1.

As discussed above, data is communicated over the Ethernet connections 115.1-3 using Ethernet frame(s). Each Ethernet frame includes specified data structures at predetermined positions on the Ethernet frame. FIG. 4 illustrates an exemplary Ethernet frame 400 which may be communicated using any of the Ethernet connections 115.1-3 of FIG. 1. The byte lengths set forth in FIG. 4 are used as an example only, and any other number of bytes may be used in place of the specified number.

As shown, the Ethernet frame 400 includes a preamble 410 and a start frame delimiter (SFD) 420. The preamble 410 and the SFD 420 include certain keywords that indicate that the frame 400 is to be transmitted over the Ethernet, and that the frame 400 is not provided in error. The preamble 410 and the SFD may occupy 8 bytes or any other number of bytes. The Ethernet frame 400 includes a destination address 430, which may identify the user equipment to which the Ethernet frame 400 is directed. The destination address 430 may occupy six bytes or any other number of bytes. The Ethernet frame 400 includes a source address 440 identifying the source of the Ethernet frame 400. The source address 440 may occupy six bytes or any other number of bytes.

The Ethernet frame 400 includes a virtual local area network (VLAN) tag 450 to identify the VLAN to which the Ethernet frame 400 belongs. The VLAN tag 450 may occupy four bytes or any other number of bytes. The Ethernet frame 400 includes a type/length indicator 460. The type/length indicator 460 indicates a type and length of the data payload 480 of the Ethernet frame 400.

The Ethernet frame 400 includes a precision time protocol (PTP) shim 470. The PTP shim 470 specifies, using the precision time protocol, the time when the remote radio head 120.k receiving the Ethernet frame 400 should transmit the Fourier transform of the signal in the Ethernet frame 400 to the user equipment 130. The time may be specified as a delay time after the Ethernet frame is received at the remote radio head. Alternatively, the time may be represented as an amount of time before or after a preset starting time point. For example, the preset starting time point may be 12:00:00 AM New York City time on Jan. 1, 2015. In another alternative, the time may be represented as a date and time, for example, 9:25:36.473 PM Los Angeles time on Mar. 2, 2015. The PTP shim 470 may occupy four bytes or any other number of bytes.

The Ethernet frame 400 includes a data payload 480. The data payload 480 stores data, including the signal, to be transmitted using the Ethernet frame 400. The data payload 480 may occupy up to 2000 bytes or any other number of bytes. The data payload 480 is described in greater detail below.

The Ethernet frame 400 includes a frame check sequence (FCS) 490. The FCS is a cyclic redundancy check which allows detection of corrupted data within the entire Ethernet frame 400. Running an FCS algorithm over the received frame data including the FCS may result in a predetermined number (e.g., a 32 bit cyclic redundancy check (CRC) as defined in IEEE 802.3) when the data has been transmitted correctly. This allows for receiving a frame and validating the FCS without knowing where the FCS field actually starts. The FCS 490 may occupy two bytes or any other number of bytes.

The data payload 480 may include a media access control (MAC) protocol data unit (PDU), which includes a MAC header 481, MAC control elements 482.1-2, MAC service data units (SDUs) 483.1-N, and an optional padding 484. A SDU is a unit of data that has been passed down from an OSI layer to a lower layer and that has not yet been encapsulated into a PDU by the lower layer. The MAC header 481 includes multiple sub-headers for each control element or logical channel SDU. The MAC control elements 482.1-2 enable control information to be piggybacked with data transmission. The MAC SDUs 483.1-N are SDUs from multiple logical channels. The optional padding 484 may be used if the MAC header 481, the MAC control elements 482.1-2, and the MAC SDUs 483.1-N fail to take up all of the bytes allotted for the data payload 480. In such cases, the optional padding 484 may occupy the remaining space.

Figure 5:
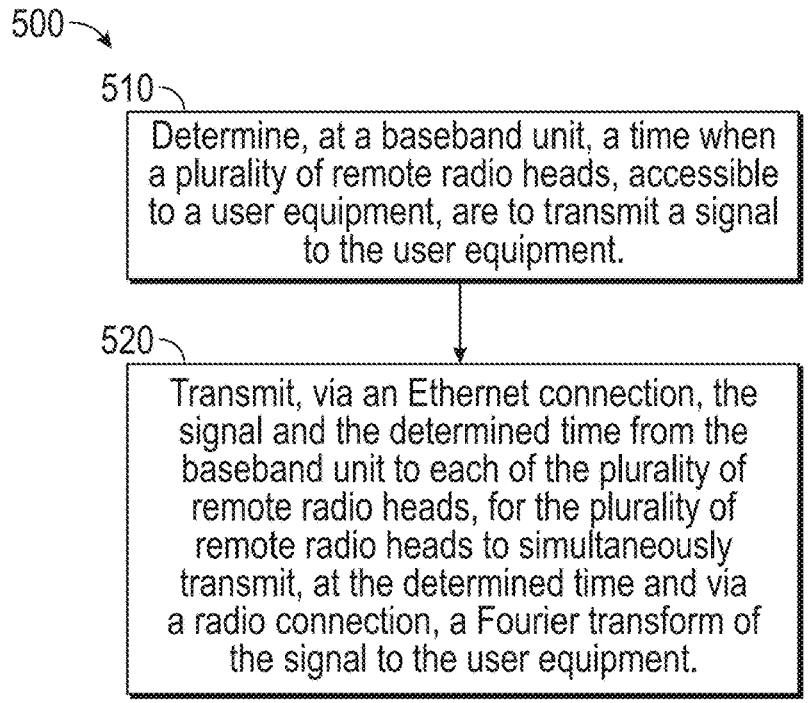
FIG. 5 illustrates an exemplary process for transmitting a signal from a baseband unit to a remote radio head of FIG. 1.

FIG. 5 illustrates an exemplary process 500 for transmitting a signal from a baseband unit to a remote radio head, such as one or more of the remote radio heads 120.1-3 of FIG. 1. The signal may be any signal transmitted to a user equipment via a radio access network, such as a voice or data signal, for example, from a telephone call or a web page. The process 500 begins at step 510, where a baseband unit (e.g., baseband unit 110) determines a time when a plurality of remote radio heads (e.g., remote radio heads 120.1-3) accessible to a user equipment (e.g., user equipment 130) are to transmit a signal to the user equipment. The Ethernet connection may be for transmitting a frame that includes one or more bytes for storing the time to transmit the signal to the user equipment, one or more bytes for storing the signal, and one or more bytes for storing the destination address of the user equipment. The time to transmit the signal to the user equipment may be determined based on a round trip time between the baseband unit and at least one of the plurality of remote radio heads.

In step 520, the baseband unit transmits, via an Ethernet connection (e.g., Ethernet connections 115.1-3), the signal and the determined time from the baseband unit to each of the remote radio heads. The signal and the determined time are transmitted for the plurality of remote radio heads to simultaneously transmit, at the determined time and via a radio connection (e.g., radio connections 125.1-3), a Fourier transform of the signal to the user equipment. After step 520, the process 500 ends.

Figure 6:
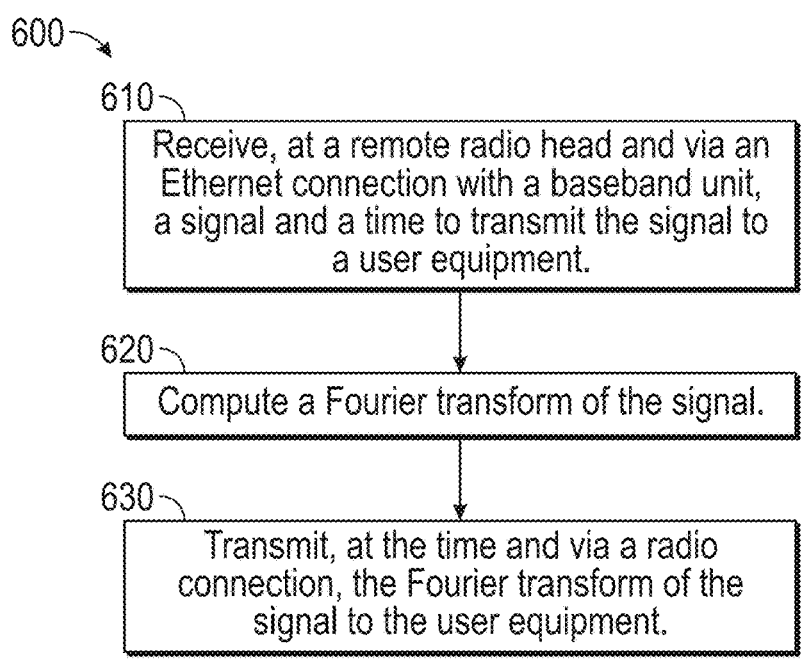
FIG. 6 illustrates an exemplary process for transmitting a signal to a user equipment using a remote radio head of FIG. 1.

FIG. 6 illustrates an exemplary process 600 for transmitting a signal to a user equipment using a remote radio head, such as one or more of the remote radio heads 120.1-3 of FIG. 1. The process 600 begins at step 610, where a remote radio head (e.g., remote radio head 120.1) receives, via an Ethernet connection (e.g., Ethernet connection 115.1 with a baseband unit (e.g., baseband unit 110), a signal and a time to transmit the signal to a user equipment (e.g., user equipment 130). The Ethernet connection may be for transmitting a frame that includes one or more bytes for storing the time to transmit the signal to the user equipment, one or more bytes for storing the signal, and one or more bytes for storing the destination address of the user equipment.

In step 620, the remote radio head computes a Fourier transform of the signal. The Fourier transform may be computed using Equations 1-2, as set forth above. Alternatively, any other technique for computing a Fourier transform may be used.

In step 630, the remote radio head transmits, at the time and via a radio connection (e.g., radio connection 125.1), the Fourier transform of to the user equipment. The remote radio head may determine when the time to transmit the signal to the user equipment has arrived via a precision clock coupled with a GPS unit. The remote radio head may transmit the Fourier transform of the signal to the user equipment simultaneously with a different remote radio head (e.g., remote radio head 120.2 or 120.3) transmitting the Fourier transform of the same signal to the user equipment. The signal received at the remote radio head may be a radio wave that is sampled in the time domain, and the Fourier transform converts that signal into the frequency domain. The Fourier transformed signal represented in the frequency domain is transmitted to the user equipment. Advantageously, all of the remote radio heads will be simultaneously transmitting the same signal to the user equipment, and none of the remote radio heads will be transmitting noise during the transmission time of the signal. After step 630, the process 600 ends.

Figure 7:
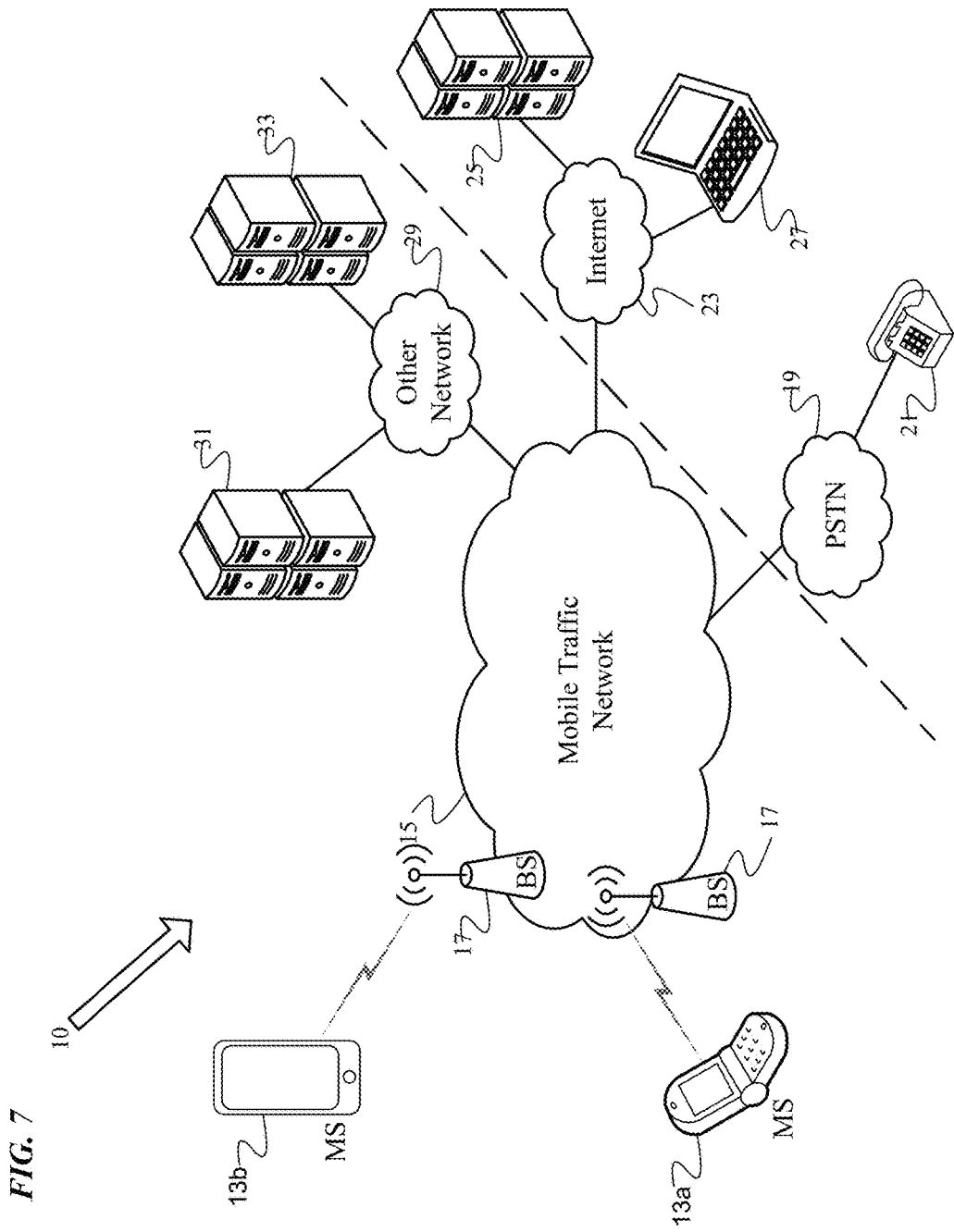
FIG. 7 is a high-level functional block diagram of an exemplary system of networks/devices that provide various communications for mobile stations.

FIG. 7 illustrates an exemplary system 10 offering a variety of mobile communication services in an Ethernet cloud radio access network system (as illustrated, for example, in FIG. 1). The servers illustrated in FIG. 7 may correspond to the baseband unit 110 of FIG. 1, and the mobile stations and personal computers of FIG. 7 may correspond to the user equipment 130 of FIG. 1. The base stations of FIG. 7 may correspond to the remote radio heads 120.1-3 of FIG. 1. The example of FIG. 7 shows two mobile stations (MSs) 13a and 13b as well as a mobile communication network 15. The network 15 provides mobile wireless communications services to those stations as well as to other mobile stations (not shown), for example, via a number of base stations (BSs) 17. The present techniques may be implemented in or used in any of a variety of available mobile networks 15, and the drawing shows only a very simplified example of a few relevant elements of the network 15 for purposes of discussion here.

The wireless mobile communication network 15 might be implemented as a network conforming to the long term evolution (LTE) standard, the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Universal Mobile Telecommunications System (UMTS) standard, the LTE standard belonging to 3GPP or other standards used for public mobile wireless communications. The mobile stations 13 may be capable of voice telephone communications through the network 15. Alternatively or additionally, the mobile stations 13a and 13b may be capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks.

Mobile stations 13 can take the form of portable handsets, smart-phones or personal digital assistants, although they may be implemented in other form factors. Program applications can be configured to execute on many different types of mobile stations 13. For example, a mobile station application can be written to execute on a binary runtime environment for mobile (BREW-based) mobile station, a Windows Mobile™ based mobile station, Android™, I-Phone™, Java Mobile™, or RIM based mobile station such as a BlackBerry™ or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31. As illustrated in FIG. 7, the servers 25 and 31 may communicate with one another over one or more networks.

A mobile station 13 communicates over the air with a base station 17, similarly to how the user equipment 130 communicates via radio connections 125.1-3 with the remote radio heads 120.1-3. The mobile station 13 communicates through the traffic network 15 for various voice and data communications, e.g. through the Internet 23 with a server 25 and/or with application servers 31. Services offered by the mobile service carrier may be hosted on a carrier operated application server 31, for communication via the networks 15 and 29. Server such as 25 and 31 may provide any of a variety of common application or service functions in support of or in addition to an application program running on the mobile station 13. For a given service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10.

As shown by the above discussion, functions relating to voice and data communication, such as synchronizing data provided from base station(s) to mobile station(s) over a radio connection, may be implemented on computers connected for data communication via the components of a packet data network, as shown in FIG. 7. Although special purpose devices may be used, such devices also may be implemented using one or more hardware platforms intended to represent a general class of data processing device commonly used to run "server" programming so as to implement the functions discussed above, albeit with an appropriate network connection for data communication.

The mobile stations 13a and 13b may correspond to the user equipment 130 of FIG. 1. The base stations 17 may correspond to the remote radio heads 120 of FIG. 1. Elements of the mobile traffic network 15 may include the baseband unit 110, the Ethernet connections 115.1-3, the virtualized base station pool 102, and the virtual machines 104.1-3 of FIG. 1. The base stations 17 may be connected with one or more of the mobile stations 13a and 13b using radio connections 125.1-3, as shown in FIG. 1.

In some implementations, data may be transmitted from the server 31 to the mobile stations 13a or 13b. The data may be transmitted via the mobile traffic network 15 and the base stations 17. One or multiple base stations 17 may be used to communicate with a single mobile station 13a or 13b, and the signals transmitted from the multiple base stations 17 to the single mobile station 13a or 13b may be synchronized as set forth in FIGS. 1-6 and the associated descriptions.

The subject technology may be implemented in conjunction with touch screen type mobile stations as well as to non-touch type mobile stations. Hence, our simple example shows the mobile station (MS) 13a as a non-touch type mobile station and shows the mobile station (MS) 13 as a touch screen type mobile station. Some implementation may involve at least some execution of programming in the mobile stations as well as implementation of user input/output functions and data communications through the network 15, from the mobile stations. Those skilled in the art presumably are familiar with the structure, programming and operations of the various types of mobile stations. However, for the sake of completeness two types of mobile stations are described below with respect to FIGS. 8 and 9.

Figure 8:
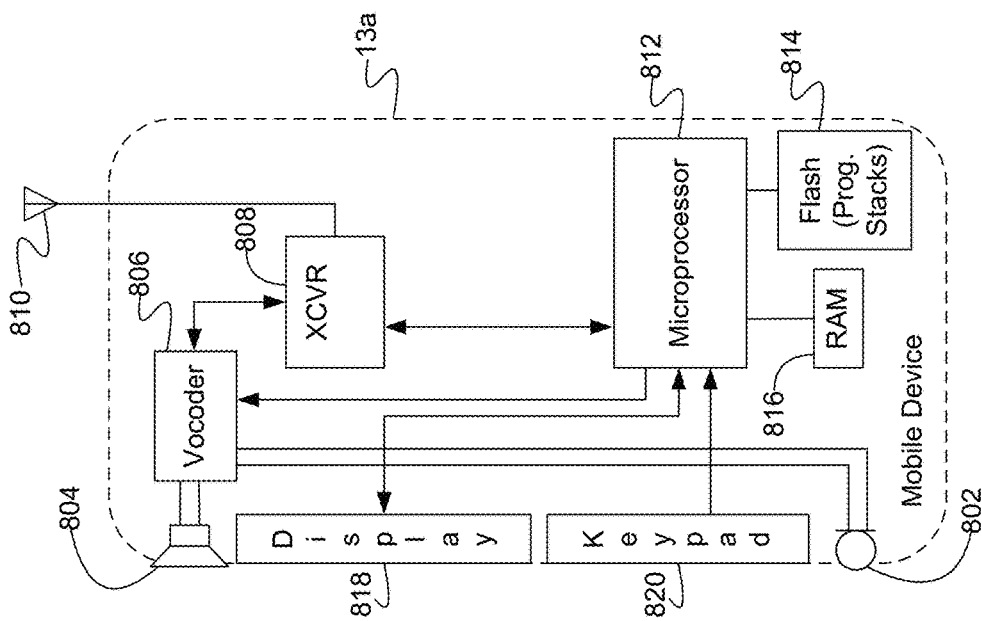
FIG. 8 is a high-level functional block diagram of an exemplary non-touch type mobile station which may access a radio access network.

FIG. 8 provides a block diagram illustration of an exemplary non-touch type mobile station 13a, which may correspond to the mobile station 13 or the user equipment 130. Although the mobile station 13a may be a smart-phone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the mobile station 13a includes a microphone 802 for audio signal input and a speaker 804 for audio signal output. The microphone 802 and speaker 804 connect to voice coding and decoding circuitry (vocoder) 806. For a voice telephone call, for example, the vocoder 806 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13a also includes at least one digital transceiver (XCVR) 808. The mobile station 13a may be configured for digital wireless communications using one or more of the common network technology types. The concepts discussed here encompass embodiments of the mobile station utilizing any digital transceivers that conform to current or future developed digital wireless communication standards. The mobile station may also be capable of analog operation via a legacy network technology.

The transceiver 808 provides two-way wireless communication of information, such as vocoded speech samples and/or digital information, in accordance with the technology of the network system 100. The transceiver 808 also sends and receives a variety of signaling messages in support of the various voice and data services provided via the mobile station 13a and the communication network. Each transceiver 808 connects through RF send and receive amplifiers (not separately shown) to an antenna 810. The transceiver may also support various types of mobile messaging services, such as short message service (SMS), enhanced messaging service (EMS) and/or multimedia messaging service (MMS).

The mobile station 13a includes a display 818 for displaying messages, menus or the like, call related information dialed by the user, calling party numbers, etc. A keypad 820 enables dialing digits for voice and/or data calls as well as generating selection inputs, for example, as may be keyed-in by the user based on a displayed menu or as a cursor control and selection of a highlighted item on a displayed screen. The display 818 and keypad 820 are the physical elements providing a textual or graphical user interface. Various combinations of the keypad 820, display 818, microphone 802 and speaker 804 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections.

A microprocessor 812 serves as a programmable controller for the mobile station 13a, in that it controls all operations of the mobile station 13a in accordance with programming that it executes, for all normal operations, including those under consideration here. In the example, the mobile station 13a includes flash type program memory 814, for storage of various "software" or "firmware" program routines and mobile configuration settings, such as mobile directory number (MDN) and/or mobile identification number (MIN), etc. The flash type program memory 814 stores programed instructions, including those described herein. The mobile station 13a may include a non-volatile random access memory (RAM) 816 for a working data processing memory. Of course, other storage devices or configurations may be added to or substituted for those in the example. In a present implementation, the flash type program memory 814 stores firmware such as a boot routine, device driver software, an operating system, call processing software and vocoder control software, and any of a wide variety of other applications, such as client browser software and short message service software. The memories 814, 816 also store various data, such as telephone numbers and server addresses, downloaded data such as multimedia content, and various data input by the user. Programming stored in the flash type program memory 814, sometimes referred to as "firmware," is loaded into and executed by the microprocessor 812.

As outlined above, the mobile station 13a includes a processor, and programming stored in the flash memory 814 configures the processor so that the mobile station is capable of performing various desired functions, including those described herein.

Figure 9:
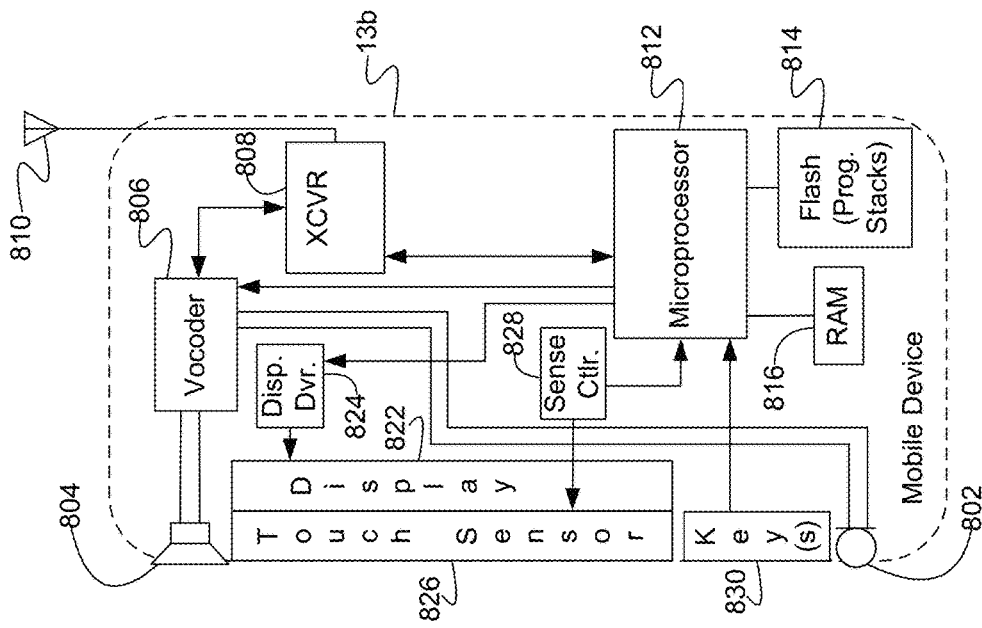
FIG. 9 is a high-level functional block diagram of an exemplary touch screen type mobile station which may access a radio access network.

For purposes of such a discussion, FIG. 9 provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 9. For example, the touch screen type mobile station 13b includes a microphone 802, speaker 804 and vocoder 806, for audio input and output functions, much like in the earlier example. The mobile station 13b also includes at least one digital transceiver (XCVR) 808, for digital wireless communications, although the mobile station 13b may include an additional digital or analog transceiver. The concepts discussed here encompass embodiments of the mobile station 13b utilizing any digital transceivers that conform to current or future developed digital wireless communication standards. As in the mobile station 13a, the transceiver 808 provides two-way wireless communication of information, such as vocoded speech samples and/or digital information, in accordance with the technology of the network system 100. The transceiver 808 also sends and receives a variety of signaling messages in support of the various voice and data services provided via the mobile station 13b and the network system 100. Each transceiver 808 connects through RF send and receive amplifiers (not separately shown) to an antenna 810. The transceiver may also support various types of mobile messaging services, such as short message service (SMS), enhanced messaging service (EMS) and/or multimedia messaging service (MMS).

As in the example of the mobile station 13a, a microprocessor 812 serves as a programmable controller for the mobile station 13b, in that it controls all operations of the mobile station 13b in accordance with programming that it executes, for all normal operations, and for operations described herein. In the example, the mobile station 13b includes flash type program memory 814, for storage of various program routines and mobile configuration settings. The mobile station 13b may also include a non-volatile random access memory (RAM) 816 for a working data processing memory. Of course, other storage devices or configurations may be added to or substituted for those in the example. Hence, outlined above, the mobile station 13b includes a processor, and programming stored in the flash memory 814 configures the processor so that the mobile station is capable of performing various desired functions, including the functions described herein.

In the example of FIG. 9, the user interface elements included a display and a keypad. The mobile station 13b may have a limited number of key(s) 830, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 822, which the microprocessor 812 controls via a display driver 824, to present visible outputs to the device user. The mobile station 13b also includes a touch/position sensor 826. The sensor 826 is relatively transparent, so that the user may view the information presented on the display 822. A sense circuit 828 sensing signals from elements of the touch/position sensor 826 and detects occurrence and position of each touch of the screen formed by the display 822 and sensor 826. The sense circuit 828 provides touch position information to the microprocessor 812, which can correlate that information to the information currently displayed via the display 822, to determine the nature of user input via the screen.

The display 822 and touch sensor 826 (and possibly one or more keys 830, if included) are the physical elements providing the textual and graphical user interface for the mobile station 13b. The microphone 802 and speaker 804 may be used as user interface elements for audio input and output.

The structure and operation of the mobile stations 13a and 13b, as outlined above, were described to by way of example, only.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. In operation, the code is stored within the general-purpose computer platform. At other times, however, the software may be stored at other locations and/or transported for loading into the appropriate general-purpose computer system. Execution of such code by a processor of the computer platform enables the platform to implement the methodology described herein.

FIGS. 10 and 11 provide functional block diagram illustrations of general purpose computer hardware platforms. FIG. 10 illustrates a network or host computer platform, as may typically be used to implement a server. FIG. 11 depicts a computer with user interface elements, as may be used to implement a personal computer or other type of work station or terminal device, although the computer of FIG. 11 may also act as a server if appropriately programmed. It is believed that the general structure and general operation of such equipment as shown in FIGS. 10 and 11 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIGS. 10 and 11). A mobile station type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the techniques for loading or storing the page at the content management server outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the virtual machines 104.1-3, transmit to UE time calculator 205, round trip time calculator, Fourier transform calculator 320, inverse Fourier transform calculator 330, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a Blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    determining, at a baseband unit, a time when a plurality of remote radio heads, accessible to a user equipment, are scheduled to transmit a signal to the user equipment; and
    transmitting via one or more Ethernet connections and in advance of the determined time the signal and information about the determined time from the baseband unit to each of the plurality of remote radio heads, to enable the plurality of remote radio heads to simultaneously transmit the signal as a radio wave, at the determined time and via a radio connection, to the user equipment.

2. The method of claim 1, wherein the scheduled time to transmit the signal to the user equipment is determined based on a round trip time between the baseband unit and at least one of the plurality of remote radio heads.

3. The method of claim 1, wherein the one or more Ethernet connections are for transmitting frames comprising one or more bytes for storing the time to transmit the signal to the user equipment and one or more bytes for storing the signal.

4. The method of claim 1, wherein the scheduled time to transmit the signal to the user equipment, for one of the remote radio heads, is represented as a delay time after receipt of the signal at the one of the remote radio heads.

5. The method of claim 1, wherein the scheduled time to transmit the signal to the user equipment is represented as an amount of time before or after a preset starting time point.

6. The method of claim 1, wherein the baseband unit comprises a centralized virtual pool of base station resources for managing a cellular network, and wherein the scheduled time to transmit the signal to the user equipment is determined using the centralized virtual pool of base station resources.

7. The method of claim 1, wherein the baseband unit is implemented using a hypervisor that runs a plurality of virtual machines implementing various base station functions, including determining the time to transmit the signal to the user equipment.

8. A method comprising:
    receiving, at a remote radio head and via an Ethernet connection with a baseband unit, a signal for transmission to a user equipment and a scheduled time to transmit the signal to the user equipment;
    determining when the scheduled time specified for transmitting the signal has arrived; and
    transmitting, at the scheduled time and via a radio connection, the signal as a radio wave to the user equipment.

9. The method of claim 8, further comprising:
    determining, via a precision clock coupled with a global positioning system unit, when the scheduled time to transmit the signal to the user equipment has arrived.

10. The method of claim 8, wherein the scheduled time to transmit the signal to the user equipment is represented, within the Ethernet connection, using a precision time protocol (PTP) shim.

11. The method of claim 8, wherein the Ethernet connection is for transmitting a frame comprising one or more bytes for storing scheduled the time to transmit the signal to the user equipment, one or more bytes for storing the signal, and one or more bytes storing a destination address of the user equipment.

12. The method of claim 8, wherein the scheduled time to transmit the signal to the user equipment is represented as a delay time after receipt of the signal at the remote radio head.

13. The method of claim 8, wherein the scheduled time to transmit the signal to the user equipment is represented as an amount of time before or after a preset starting time point.

14. The method of claim 8, wherein the remote radio head transmits a Fourier transform of the signal to the user equipment simultaneously with a different remote radio head transmitting a Fourier transform of the signal to the user equipment.

15. A remote radio head comprising:
    an Ethernet connection with a baseband unit for receiving a signal for transmission to a user equipment and a scheduled time to transmit the signal to the user equipment;
    a clock, the clock being configured to determine when the scheduled time to transmit has occurred; and
    a radio transmitter for transmitting, at the scheduled time, the signal to the user equipment.

16. The remote radio head of claim 15, further comprising:
   a precision clock coupled with a global positioning system unit for determining when the scheduled time to transmit the signal to the user equipment has arrived.

17. The remote radio head of claim 15, wherein the scheduled time to transmit the signal to the user equipment is represented, within the Ethernet connection, using a precision time protocol (PTP) shim.

18. The remote radio head of claim 15, wherein the Ethernet connection is for transmitting a frame comprising one or more bytes for storing the time to transmit the signal to the user equipment, one or more bytes for storing the signal, and one or more bytes storing a destination address of the user equipment.

19. The remote radio head of claim 15, wherein the scheduled time to transmit the signal to the user equipment is represented as a delay time after receipt of the signal at the remote radio head.

20. The remote radio head of claim 15, wherein the scheduled time to transmit the signal to the user equipment is represented as an amount of time before or after a preset starting time point.

* * * * *